(12) United States Patent
Hering et al.

(10) Patent No.: US 6,928,714 B2
(45) Date of Patent: Aug. 16, 2005

(54) METHOD OF ASSEMBLING A SEALING RING IN AN OUTER ANNULAR GROOVE

(76) Inventors: Martin Hering, 8055 Lexington Pl., Apt. #5, Pleasant Prairie, WI (US) 53158-2513; Karl Aage Lindholm Jensen, Markledet 20, DK-5220 Odense (DK)

(*) Notice: Subject to any disclaimer, the term of this patent is extended or adjusted under 35 U.S.C. 154(b) by 23 days.

(21) Appl. No.: 10/782,157

(22) Filed: Feb. 19, 2004

(65) Prior Publication Data

US 2004/0205952 A1 Oct. 21, 2004

Related U.S. Application Data

(62) Division of application No. 10/111,884, filed as application No. PCT/EP00/09471 on Sep. 28, 2000, now Pat. No. 6,862,789.

(30) Foreign Application Priority Data

Nov. 5, 1999 (DE) .......................................... 199 53 475

(51) Int. Cl.[7] .............................................. B23P 11/02
(52) U.S. Cl. ........................................ 29/451; 29/888.3
(58) Field of Search .......................... 29/235, 450, 451, 29/252, 888.3, 890.124

(56) References Cited

U.S. PATENT DOCUMENTS

| | | | | |
|---|---|---|---|---|
| 3,940,845 A | * | 3/1976 | Czerwiak ....................... | 29/235 |
| 3,981,066 A | * | 9/1976 | Calvert ......................... | 29/451 |
| 4,550,486 A | * | 11/1985 | Yarimizu ....................... | 29/451 |
| 5,564,177 A | * | 10/1996 | Fernandes et al. ............. | 29/451 |
| 5,956,830 A | * | 9/1999 | Imbus et al. ................... | 29/235 |
| 6,012,209 A | * | 1/2000 | Whetstone .................... | 29/235 |

* cited by examiner

*Primary Examiner*—David P. Bryant
(74) *Attorney, Agent, or Firm*—Michael J. Striker

(57) ABSTRACT

The invention relates to an assembly tool for assembling a sealing ring (3) in an annular groove (4, 9) of a machine part (1, 7), in particular of a valve plate (7). By the provision that the assembly tool (10, 23) includes a pneumatic piston-cylinder unit (11, 12, 26, 27) for uniformly press-fitting the sealing ring (3) into the annular groove (4, 9), a simple assembly tool that is economical to make, is versatile to use and can be used in mobile application, and nevertheless enables reliable seal assembly without injuring anyone.

2 Claims, 2 Drawing Sheets

METHOD OF ASSEMBLING A SEALING RING IN AN OUTER ANNULAR GROOVE

CROSS REFERENCE TO A RELATED APPLICATION

This application is a division of application Ser. No. 10/111,884 filed Dec. 26, 2002 now U.S. Pat. No. 6,862,789, which is a 371 of PCT/EP00/09471 filed Sep. 28, 2000.

BACKGROUND OF THE INVENTION

The invention relates to an assembly tool for assembling a sealing ring in an annular groove of a machine part, in particular of a valve plate.

There are already known assembly tools in which the seal is press-fitted into the sealing groove by a hydraulic press. Such hydraulic presses are complicated and expensive to produce. Moreover, they are large and heavy and are accordingly not easy to transport. For this reason, the user typically procures only a single such device and installs it at some central point in a repair and maintenance facility This in turn requires that the individual machine parts, such as valve plates, be brought to the central maintenance facility, so that the new sealing rings can be inserted there, in order for the seals to be refurbished.

Power tools are also known, such as a kind of screw driver with a wide, rounded end, with the aid of which a sealing ring can be pressed, one piece at a time, from outside into an annular groove. However, this method requires major physical effort as well as skill on the part of the user, whose is furthermore not infrequently injured in the process. Moreover, this method does not produce reliable results, since damage to the seal during assembly frequently occurs.

SUMMARY OF THE INVENTION

The object of the invention is to disclose an assembly tool of the type defined at the outset which is relatively simple and economical to produce and is also simple and safe to use.

According to the invention, this object is attained in that the assembly tool includes a pneumatic piston-cylinder unit for uniform press-fitting of the sealing ring into the annular groove. The pneumatic piston-cylinder unit of the invention relieves the mechanic of the laborious work and reduces the risk of injury. By the simultaneous press-fitting of the sealing ring, on the one hand damage can be avoided, and on the other a correct seat of the press-fitted sealing ring can be assured. The assembly tool of the invention need not be stationed at some central point, because in contrast to known, hydraulically driven tools, a pneumatic drive can be connected on-site to the compressed air supply lines that are present anyway, in factory buildings. The assembly tool can therefore be simple in design, which reduces the production and maintenance costs and improves its reliability in heavy-duty everyday use. Moreover, the assembly tool of the invention can be transported easily and conveniently.

In a preferred embodiment of the assembly tool, the pneumatic piston-cylinder unit has a work piston with an axially protruding, annular assembly portion, which by subjecting the piston-cylinder unit to compressed air press-fits a sealing ring uniformly into the annular groove.

In a further advantageous feature of the invention, it is provided that the annular assembly portion of the work piston is provided, on the radially inner side of its free end, with an encompassing recess for guiding the sealing ring, and the flanks of the recess are chamfered such that upon an axial displacement of the work piston, they compress the sealing ring on one side and press it into the annular groove on the other.

The aforementioned embodiment can be used especially advantageously in conjunction with an improved ring seal, designed especially for automated assembly by the assembly tool of the invention, in which seal the sealing ring has two encompassing protrusions, which are disposed parallel to one another such that they form a recess of V-shaped cross section between them.

The sealing ring thus designed is premounted on the annular groove in such a way that the V-shaped recess is open toward the annular groove. During the automated assembly with the assembly tool, the sealing ring is first compressed by the work piston, so that the V-shaped recess closes. The thus-compressed sealing ring is imparted, from one edge or is preferably from a chamfered flank of the work piston, with a radially inward-oriented force component, by which the sealing ring is pressed into the annular groove. The cross section of the annular groove is preferably widened toward the bottom of the groove, so that the elastically expanding cross section of the sealing ring inside the annular groove anchors the sealing ring firmly in the annular groove.

In an advantageous feature of the invention, an assembly tool suited in particular for use with a machine part in which an annular groove is located on the outside of a sealing portion, has a work piston that can be braced on one axial side of the sealing portion of the machine part or on the sealing ring. The assembly tool furthermore has at least one flange part, with a support portion that can be braced axially on the other axial side of the sealing portion or on the sealing ring and with a flange portion that can be connected solidly for the sake of sealing assembly to a corresponding flange portion of the cylindrical part. These provisions make secure, firm positioning of the assembly tool to the machine part possible, and as a result the correct assembly of the sealing ring without damage to it is assured.

For releasable connection of the aforementioned flange portions of the cylindrical part and the flange part, a clamp is preferably provided, in particular a profiled cuff-type connection, which can be installed simply and removed again equally easily after use.

In an advantageous feature of the invention, it is provided that the applicable flange portion of the cylindrical part and flange part is embodied in the form of a standard flange of the kind known for connecting valves and pipes, and the clamp is embodied in the form of an associated known standard clamp. In this embodiment, it is advantageously possible to use easily procured standard parts, and in particular the standard clamp. Not only does this make procurement of the parts more economical. It is also advantageous that the user of the assembly tool is typically familiar with handling the standard flanges and the standard clamp. As a result, the handling can be done quickly and without mistakes from the very outset.

In an advantageous embodiment, the flange part is embodied annularly around a radially inner recess. This allows it to be used in such machine parts as valve plates, which are solidly connected to axially extending actuating rods or the like. On such machine parts, the annular flange part can be mounted in such a way that the axially protruding actuating rods protrude through its radially inner recess.

For the same reason, an embodiment can be advantageous in which the cylindrical part and the work piston are embodied annularly around an inner recess.

Another embodiment provides that the cylindrical part and the work piston are embodied as cup-shaped. This embodiment is simpler to produce but can be considered only for machine parts of the kind that have no substantial axial protrusion on the axial side on which the piston-cylinder unit is to be mounted. This is true for instance for flat valve plates, which are connected to an actuating rod only on the other axial side.

In a method for assembling a sealing ring in an outer annular groove of a machine part, in particular of a valve plate, using an assembly tool of the above-described part, the following method steps are provided:

The sealing ring is premounted by hand on the machine part, so that it rests on the outside of the annular groove;

a pneumatic piston-cylinder unit is placed and firmly retained on one axial side of the machine part on this part or on the sealing ring;

a flange part is placed on the other axial side of the machine part on that part or on the sealing ring and solidly connected to the piston-cylinder unit by means of a clamp;

the piston-cylinder unit is subjected to compressed air, so that the work piston, with its axially protruding, annular assembly portion, press-fits the sealing ring uniformly into the annular groove;

the assembly tool is removed from the machine part, preferably after a pressure relief of the piston-cylinder unit and after release of the clamp.

BRIEF DESCRIPTION OF THE DRAWINGS

Exemplary embodiments of the invention are described in further detail below in conjunction with the drawing. Shown are:

FIG. 2, the closing element of FIG. 1, with an assembly tool secured to it, in a first embodiment, before the sealing ring is press-fitted in;

DESCRIPTION OF THE PREFERRED EMBODIMENTS

Figure 1:
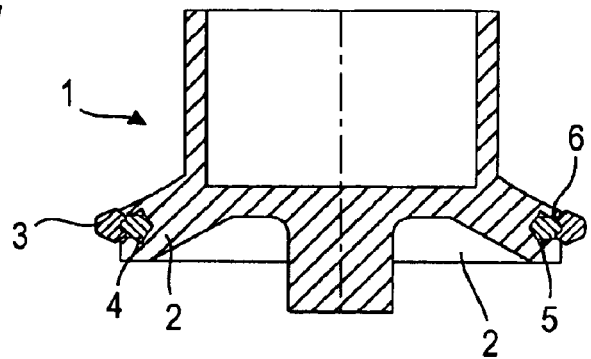
FIG. 1, a sectional view of a closing element for a valve, with a preassembled sealing ring.

In FIG. 1, a closing element 1 can be seen of a double-seat valve, not otherwise shown, of the kind used in the foods industry for handling, for instance for dispensing pastelike foods into containers. The closing element 1 has an encompassing, obliquely radially outward-protruding sealing portion 2, which is provided with an annular groove 4 that is open radially outward.

A sealing ring 3 used here differs from simple O-ring seals in having two encompassing protrusions 6, which are disposed parallel to one another in such a way that between them they form a recess 5 of V-shaped cross section.

Figure 2:
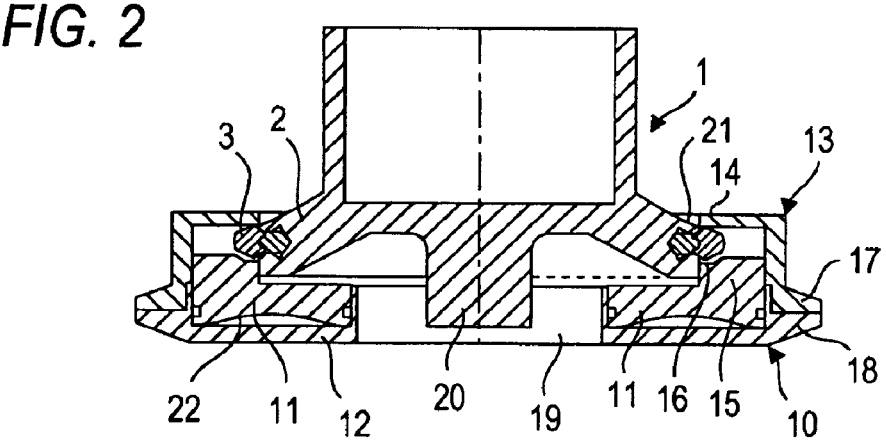

In FIG. 2, an assembly tool 10 can be seen, secured to the closing element 1. The assembly tool comprises an annular work piston 11, which is disposed axially displaceably in a likewise annular cylindrical part 12, and a flange part 13; the sealing ring 3 is clamped in place between a support portion 14 of the flange part 13 and an axially protruding, annular assembly portion 15 of the work piston 11. For better guidance during the assembly, the assembly portion 15 of the work piston 11 has an encompassing recess 16 on the radially inner side.

The flange part 13 has a radially outward-protruding flange portion 17, which can be connected solidly to a corresponding flange portion 18 of the cylindrical part 12. The flange portions 17, 18 are designed in the form of known standard flanges and are held together by a standard clamp, not shown.

There is space in an inner recess 19 of the cylindrical part 12 for an axially protruding portion 20 of the closing element 1, whose sealing portion 2 is disposed inside a radially inner recess 21 of the flange part 13.

Figure 3:
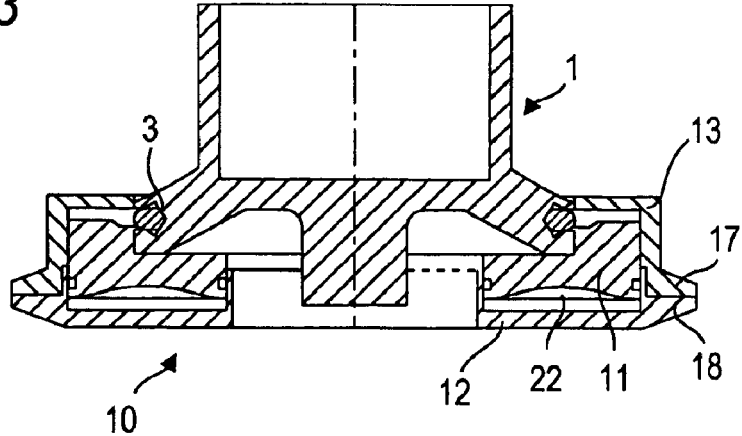
FIG. 3, the same as FIG. 2, but after the press-fitting of the sealing ring.

FIG. 2 shows the situation after the positioning of the assembly tool 10 on the closing element 1. For assembling the sealing ring 3, the interior 22 of the piston-cylinder unit 11, 12 is now subjected to compressed air; the sealing ring 3 is initially axially compressed between the assembly portion 15 of the work piston 11 and the support portion 14 of the flange part 13 and is finally pressed radially into the annular groove 4. This situation is shown in FIG. 3. The annular groove 4 widens radially inward in the axial direction, so that the sealing ring 3 can elastically in the interior of the annular groove 4 and thus be firmly anchored in the annular groove 4.

After the release of a standard clamp, not shown, which has joined the two standard flanges 17, 18 firmly to one another during the press-fitting process, the piston-cylinder unit 11, 12 on the one hand and the flange part 13 on the other can be removed from the closing element 1. The assembly of the sealing ring 3 is thus completed.

Figure 4:
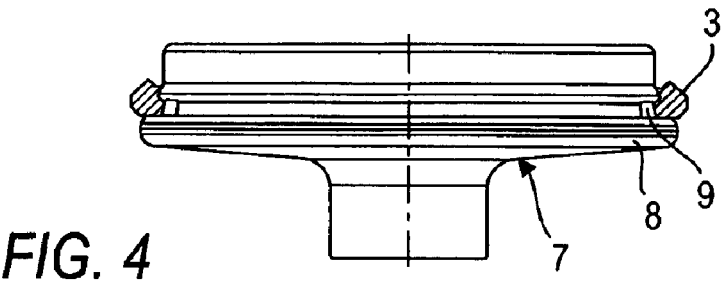
FIG. 4, a view corresponding to FIG. 1 of a valve plate.

FIG. 4 shows a valve closing element, embodied as a valve plate 7, in which a radially outward-protruding sealing portion 8 is provided with an asymmetrical annular groove 9.

Figure 5:
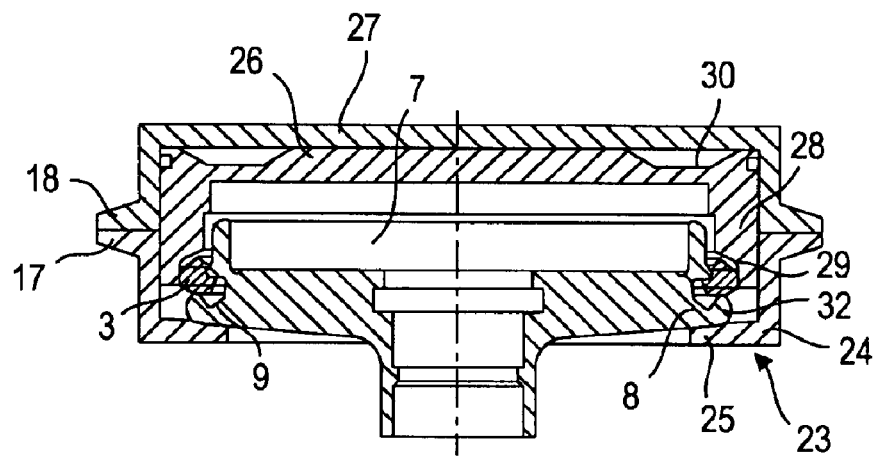
FIG. 5, the valve plate of FIG. 4, with an assembly tool secured in it, in a second embodiment, before the press-fitting of the sealing ring.

FIG. 5 shows a modified assembly tool 23, which likewise includes a piston-cylinder unit and a flange part 24. The flange part 24 again has a support portion 25, which contacts one axial side of the sealing portion 8 of the valve plate 7. The piston-cylinder unit comprises an essentially cup-shaped work piston 26, which is disposed axially displaceably in a likewise cup-shaped cylindrical part 27. The work piston 26 furthermore has an axially protruding, annular assembly portion 28, which on its radially inner side has an encompassing recess 29 for guiding the sealing ring 3.

Figure 6:
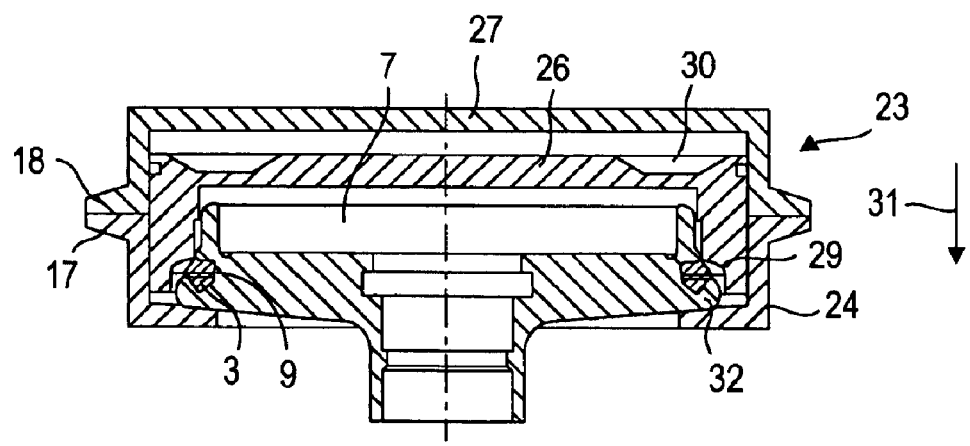
FIG. 6, the same as FIG. 5, but after the press-fitting of the sealing ring.

FIG. 5 shows the situation after the positioning of the assembly tool 23 on the valve plate 7. For assembling the sealing ring 3, the interior 30 of the piston-cylinder unit 26, 27 is now subjected to compressed air, as a consequence of which the work piston 26 moves in the direction of the arrow 31, as shown in FIG. 6. In the process, the sealing ring 3 is compressed between the recess 29 of the work piston 26 and a radially far-protruding groove wall 32 of the sealing portion 8 embodied on the valve plate 7 and is pressed both obliquely downward and radially inward into the annular groove 9.

After the release of a standard clamp, not shown, which has firmly joined the two standard flanges 17, 18 to one another during the press-fitting operation, the piston-cylinder unit 26, 27 on the one hand and the flange part 24 on the other can be removed from the valve plate 7. The assembly of the sealing ring 3 is thus completed.

List of Reference Numerals

| | |
|---|---|
| 1 | Closing element |
| 2 | Sealing portion |
| 3 | Sealing ring |
| 4 | Annular groove |
| 5 | Recess |
| 6 | Protrusion |
| 7 | Valve plate |
| 8 | Sealing portion |
| 9 | Annular groove |
| 10 | Assembly tool |
| 11 | Work piston |
| 12 | Cylindrical part |
| 13 | Flange part |
| 14 | Support portion |
| 15 | Assembly portion |
| 16 | Recess |
| 17 | Flange portion |
| 18 | Flange portion |
| 19 | Recess |
| 20 | Portion |
| 21 | Recess |
| 22 | Interior |
| 23 | Assembly tool |
| 24 | Flange part |
| 25 | Support portion |
| 26 | Work piston |
| 27 | Cylindrical part |
| 28 | Assembly portion |
| 29 | Recess |
| 30 | Interior |
| 31 | Direction of arrow |
| 32 | Groove wall |

What is claimed is:

1. A method of assembling a sealing ring in an outer annular groove of a machine part formed as a valve plate with the use of an assembly tool, comprising the steps of premounting the sealing ring by hand on the machine part so that the sealing ring rests on an outside of the annular groove; placing a pneumatic piston-cylinder unit and firmly retaining the piston-cylinder unit on an axial side of the machine part or on the sealing ring; placing a flange part on another axial side of the machine part or on the sealing ring and solidly connecting the flange part to the piston-cylinder unit by a clamp; subjecting the piston-cylinder unit to compressed air, so that an axially protruding annular assembly portion of the piston-cylinder unit press-fits the sealing ring uniformly into the annular groove; and removing the assembly tool from the machine part.

2. A method as defined in claim 1, wherein said removing includes removing the assembly tool from the machine part after a pressure relief of the piston-cylinder unit and after a release of the clamp.

\* \* \* \* \*